(No Model.)
N. J. PRITCHARD.
VARIABLE SPEED GEARING.
No. 515,534. Patented Feb. 27, 1894.
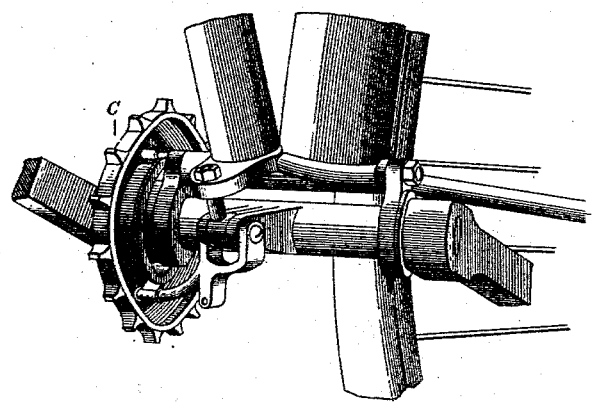
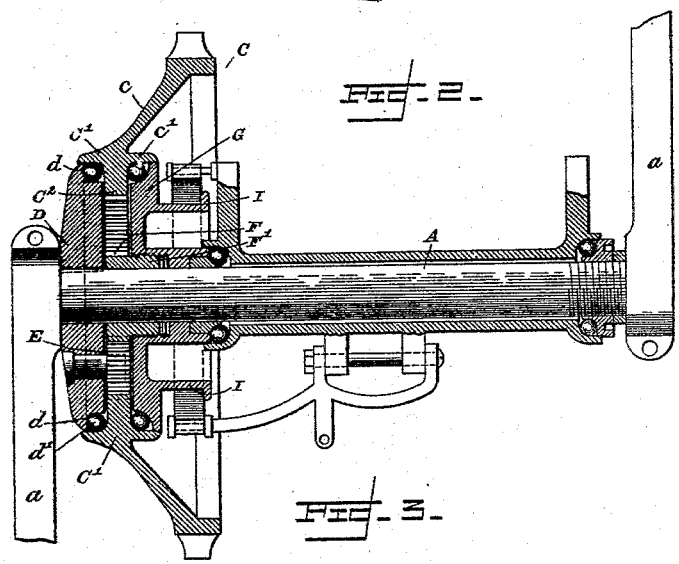
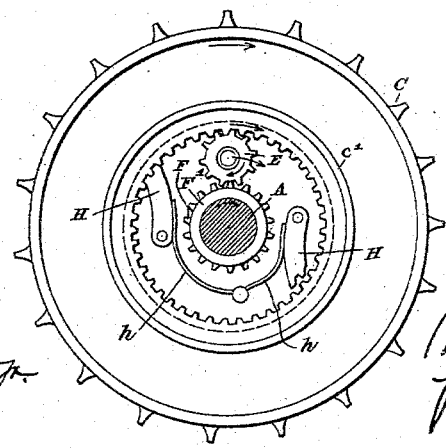
Witnesses
Edw. S. Duvall, Jr.
Wm. L. Boyden
Inventor
Nathaniel J. Pritchard
per Fred S. Tasker,
Attorney

UNITED STATES PATENT OFFICE.

NATHANIEL J. PRITCHARD, OF SHENANDOAH, VIRGINIA, ASSIGNOR OF TWO-THIRDS TO SAMUEL REESE PRITCHARD AND JOHN CURTIS SCHOOLEY, OF SAME PLACE.

VARIABLE-SPEED GEARING.

SPECIFICATION forming part of Letters Patent No. 515,534, dated February 27, 1894.

Application filed April 29, 1893. Serial No. 472,331. (No model.)

*To all whom it may concern:*

Be it known that I, NATHANIEL J. PRITCHARD, a citizen of the United States, residing at Shenandoah, in the county of Page and State of Virginia, have invented certain new and useful Improvements in Variable-Speed Gearing; and I do hereby declare the following to be a full, clear, and exact description of the invention, such as will enable others skilled in the art to which it appertains to make and use the same.

This invention relates to a speed mechanism for bicycles, velocipedes or other similar machinery.

The object is to provide means for easily increasing the speed a greater or less extent whenever desired, said means being entirely under the control of the rider at all times.

The present invention is an improvement upon that shown and described in my other pending application for Letters-Patent, filed October 24, 1892, Serial No. 449,874, and it consists essentially in the construction, arrangement and combination of parts, substantially as will be hereinafter described and claimed.

In the annexed drawings illustrating my invention: Figure 1 is a perspective view of a portion of a bicycle provided with my present improvements. Fig. 2 is an enlarged vertical sectional elevation of my improved speed increasing mechanism showing the same applied to a pedal shaft of a safety bicycle. Fig. 3 is a right hand end elevation of the sprocket wheel and the mechanical parts arranged within the same.

Similar letters of reference designate corresponding parts throughout the several figures of the drawings.

My speed increasing mechanism is applicable to many different kinds of machinery. It is particularly useful in connection with bicycles or other velocipedes. In the present case I shall explain the same as applied to a pedal shaft of a safety bicycle. It is not to be inferred however that I consider myself restricted to this use of the invention, but I explicitly state that it may be used in any connection where it is found serviceable and advantageous.

A denotes the pedal shaft of a bicycle, provided with the pedal cranks $a$ $a$ adapted to carry the pedals at their outer ends.

C denotes the sprocket or chain wheel. It is made in the peculiar shape shown in Fig. 2, having an outer toothed rim which is connected to a sleeve-like or annular rim $C'$ of considerably less diameter than the outer cogged rim, by means preferably of the inclined or conical shaped connection $c$. This form of the sprocket wheel construction may however vary. I simply employ it for the purpose of properly locating the cogged rim from the adjacent pedal shaft and yet place the multiplying gearing at the desired point upon the pedal shaft. The conical part $c$ however of the sprocket wheel may be more or less inclined or straight if preferred. The rim $C'$ has an internal series of cogs or teeth to provide a gear wheel $C^2$, all as clearly shown in Fig. 2.

On the shaft A near the left hand pedal shaft $a$ is a disk D, rigidly secured thereto and having a peripheral flange $d$ whereby the periphery of the disk D is enabled to have a peripheral shoulder or rabbet thereon to contain a series of balls $d'$ which constitutes a ball bearing, said balls being located as shown in Fig. 2, neatly between the flange $d$ and a corresponding horizontal flange on the frame $C'$ of the sprocket wheel. The disk D is therefore practically located inside of the sprocket wheel rim $C'$. This disk D carries a pinion E, supported by a stud or journal held horizontally in the disk D. The pinion E engages the teeth of the gear wheel $C^2$. The pinion E likewise engages the teeth of a small gear wheel F which loosely surrounds shaft A, being integral with a sleeve $F'$ which is screwed into the wheel G and thereby rigidly connected to said wheel G. Thus it will be seen that the three gears $C^2$, E and F lie in the same vertical plane or in other words are situated in line with each other, being in engagement as shown clearly in Figs. 2 and 3.

The wheel G is formed integral with a grooved rim I, adapted for the application thereto of a brake strap or brake shoe, which by pressing thereon can retard the motion of the wheel G or stop it entirely. The wheel G obviously is loose upon shaft A. Wheel G is formed near its periphery with a flange and rabbet to contain the balls constituting a circular series and providing a ball bearing, which balls are located between the periphery of wheel G and a corresponding flange $c'$ on the rim $C'$ of the sprocket wheel. Thus it will be seen that on one side of the vertical train of gears $C^2$ E and F is located the fixed disk D, with a ball-bearing between it and the sprocket wheel, while on the other side of said train of gears is the loose friction wheel with a ball bearing between it and the sprocket wheel, both fixed pulley and the friction wheel being practically situated inside of the sprocket wheel.

In Fig. 3, I have shown a couple of pawls H H pivoted to the inner face of the disk D and having springs $h\,h$ bearing upon them to force their teeth into engagement with the teeth of the internally cogged gear $C^2$. This arrangement of pawls is for the purpose of preventing any backward movement of the sprocket wheel and causing the result of the movement of the intermeshed gears to be forward or in a proper direction of rotation to propel the bicycle in the right manner.

Suitable connections may be made between the frictionally acting wheel and the brake shoe or strap which is applied thereto and a lever situated near the steering head of the machine so that the rider may at any time apply the brake strap to or release it from the friction rim I, thereby stopping, retarding or permitting the latter to start. It will be evident that as the shaft A revolves, disk D will likewise revolve, carrying with it the pinion E, which will have two motions, one around the axis of the shaft and another on its own axis and since this pinion E is in mesh with the gears $C^2$ and F, the result will be to drive the sprocket wheel C and also the friction wheel I, simultaneously at a uniform rate of speed. Such will be the case when the friction wheel is free to move under the actuation of the gearing. If however we stop the friction wheel by applying the brake thereto, we make it a fixed wheel or in other words a dead wheel and this will cause the pinion E to drive the sprocket C at a much higher rate of speed, say double the speed that it moved heretofore such being the characteristic effect of an epicyclic train of gearing, including one dead or stationary gear. If however, instead of stopping the friction wheel I G, we simply retard it or slow it up, we will speed up the sprocket wheel to a certain extent but not to as high a speed as before. Thus by regulating the action of the friction wheel and its speed, we can determine any desired increase for the speed of the sprocket wheel and consequently can regulate and easily govern the speed of the machine.

Having thus described my invention, what I claim as new, and desire to secure by Letters Patent, is—

1. In a variable speed mechanism for bicycles, the combination of a shaft, a toothed wheel indirectly supported thereby and having a flanged rim and internally toothed, a disk fast upon the shaft, a ball bearing between said disk and the flanged rim, a pinion carried by the disk, a smaller gear on the shaft, said gearing being arranged in a vertical line with the several gears in engagement, and a friction wheel connected to the smaller gear and having a ball bearing between it and the flanged rim, and the brake mechanism, all substantially as described.

2. The combination of the shaft, a sprocket wheel having an outer toothed rim and an inner flanged rim, said inner rim being toothed, a disk fast on the shaft and peripherally flanged so as to permit a ball bearing to be located between it and the flanged rim of the sprocket wheel, a pinion carried by the fixed disk, a smaller gear wheel loose on the shaft, said smaller gear wheel, pinion and internal gear being in the same vertical plane and in engagement with each other and a friction wheel connected to the smaller loose gear and peripherally flanged to permit a ball bearing to be located between it and the flanged rim of the sprocket wheel, together with the brake strap, all substantially as described.

In testimony whereof I affix my signature in presence of two witnesses.

NATHANIEL J. PRITCHARD.

Witnesses:
C. J. STEVENS,
C. L. STEVENS.